United States Patent [19]

Ferdinand et al.

[11] Patent Number: 4,463,644
[45] Date of Patent: Aug. 7, 1984

[54] STRAIGHT EDGE GUIDE

[75] Inventors: Irwin J. Ferdinand, Glenco; Richard Sylvan, Glenview; Michael Peterson, Evanston, all of Ill.

[73] Assignee: Hirsh Company, Skokie, Ill.

[21] Appl. No.: 500,451

[22] Filed: Jun. 2, 1983

Related U.S. Application Data

[60] Continuation-in-part of Ser. No. 402,957, Jul. 29, 1982, abandoned, which is a division of Ser. No. 235,981, Feb. 19, 1981, Pat. No. 4,381,103.

[51] Int. Cl.³ .................................................. B27B 9/04
[52] U.S. Cl. ........................................ 83/745; 33/403; 83/698; 269/47; 269/254 R; 403/297; 403/402
[58] Field of Search ................ 83/745, 180, 182, 698; 33/403, 452, 478, 161, 430; 269/47, 49, 254; 228/49 B; 403/297, 292, 402

[56] References Cited

U.S. PATENT DOCUMENTS

| | | | |
|---|---|---|---|
| 1,149,277 | 8/1915 | Moffatt | 33/479 |
| 1,349,349 | 8/1920 | Thiman | 33/452 |
| 2,625,184 | 1/1953 | Harbert | 33/500 |
| 2,677,399 | 5/1954 | Getsinger | 83/467 R |
| 2,708,465 | 5/1955 | Huebner et al. | 83/745 |
| 2,735,455 | 2/1956 | Forsberg | 83/745 |
| 2,942,633 | 6/1960 | King | 83/745 |
| 2,997,317 | 8/1961 | Scott | 403/297 X |
| 3,011,530 | 12/1961 | Lamb | 83/745 |
| 3,085,343 | 4/1963 | Skripsky | 33/446 |
| 3,186,452 | 6/1965 | Magnussen | 83/745 |
| 3,586,077 | 6/1971 | Pease | 30/376 |
| 3,704,014 | 11/1972 | Keene | 269/249 |
| 3,822,101 | 7/1974 | Schneider | 403/297 X |
| 3,829,231 | 8/1974 | Hamilton | 83/745 |
| 3,874,261 | 4/1975 | Murray | 83/471.3 |
| 3,900,269 | 8/1975 | Pavlot | 403/292 |
| 3,910,146 | 10/1975 | Earl | 83/745 |
| 3,915,045 | 10/1975 | Kitzman | 83/745 |
| 3,922,101 | 11/1975 | Salmon, Jr. et al. | 403/292 |
| 4,050,340 | 9/1977 | Flanders | 83/743 |
| 4,059,038 | 11/1977 | Rietema | 83/745 |
| 4,075,920 | 2/1978 | Neal | 83/745 |
| 4,088,290 | 5/1978 | Novello | 83/745 |
| 4,159,758 | 7/1979 | Courson | 403/297 X |
| 4,176,572 | 12/1979 | Pennington | 83/862 |
| 4,202,233 | 5/1980 | Larson | 83/745 |
| 4,244,118 | 1/1981 | Matuszak | 83/745 X |

OTHER PUBLICATIONS

McMaster and Carr, 1980 Catalogue–title, page & p. 1269.
Macklanburg-Duncan Co., Cutting Guide Advertisement, (2 pages).

Primary Examiner—Frank T. Yost
Attorney, Agent, or Firm—Dressler, Goldsmith, Shore, Sutker & Milnamow, Ltd.

[57] ABSTRACT

Two rails, each having a straight edge, two ends and a cross section defining a channel, are placed in an end-to-end butting relationship to form a continuous straight edge. A joiner plate has an arcuate cross section and has lateral margins for being received in the rail channels. The plate is placed in the rail channels and is fastened to the rails so as to deflect the plate downwardly and force the lateral margins of the plate tight against the rails to align the rails and hold the rails together.

9 Claims, 12 Drawing Figures

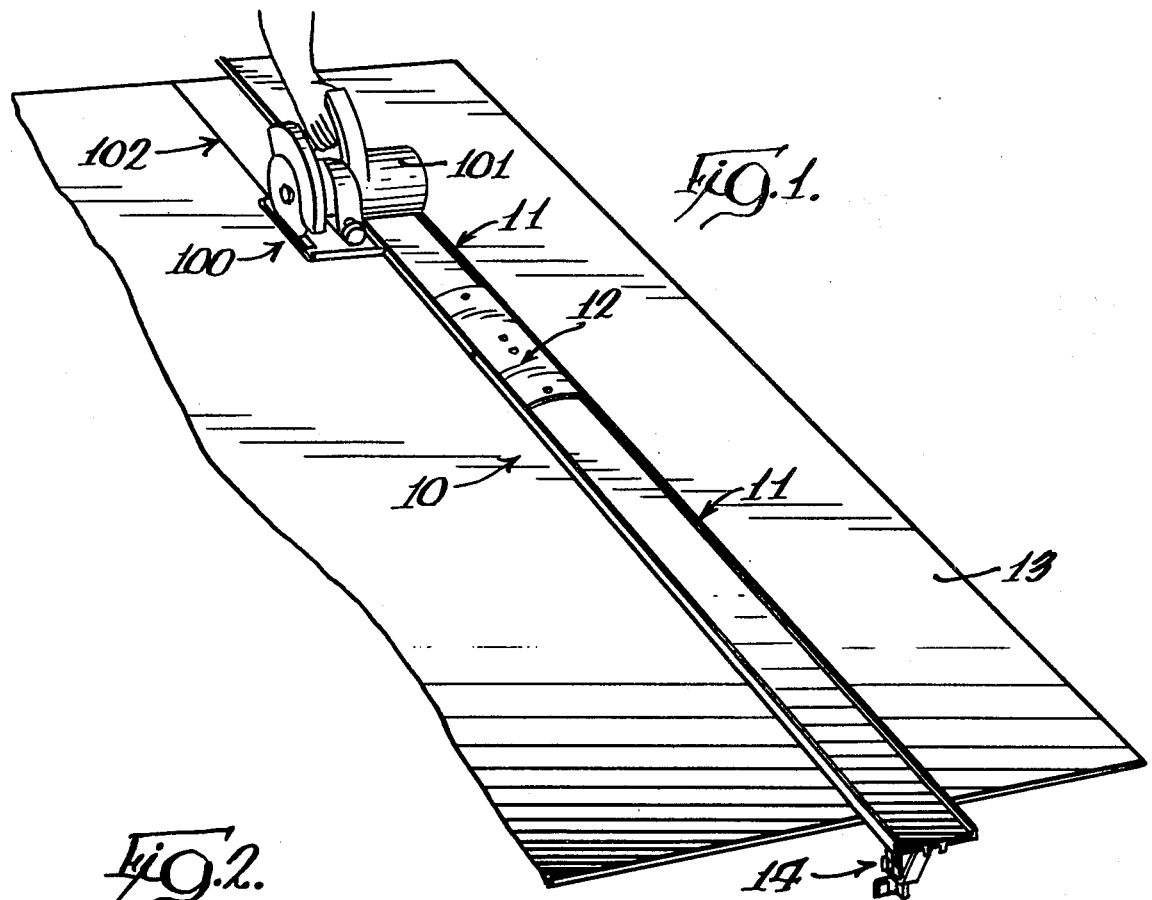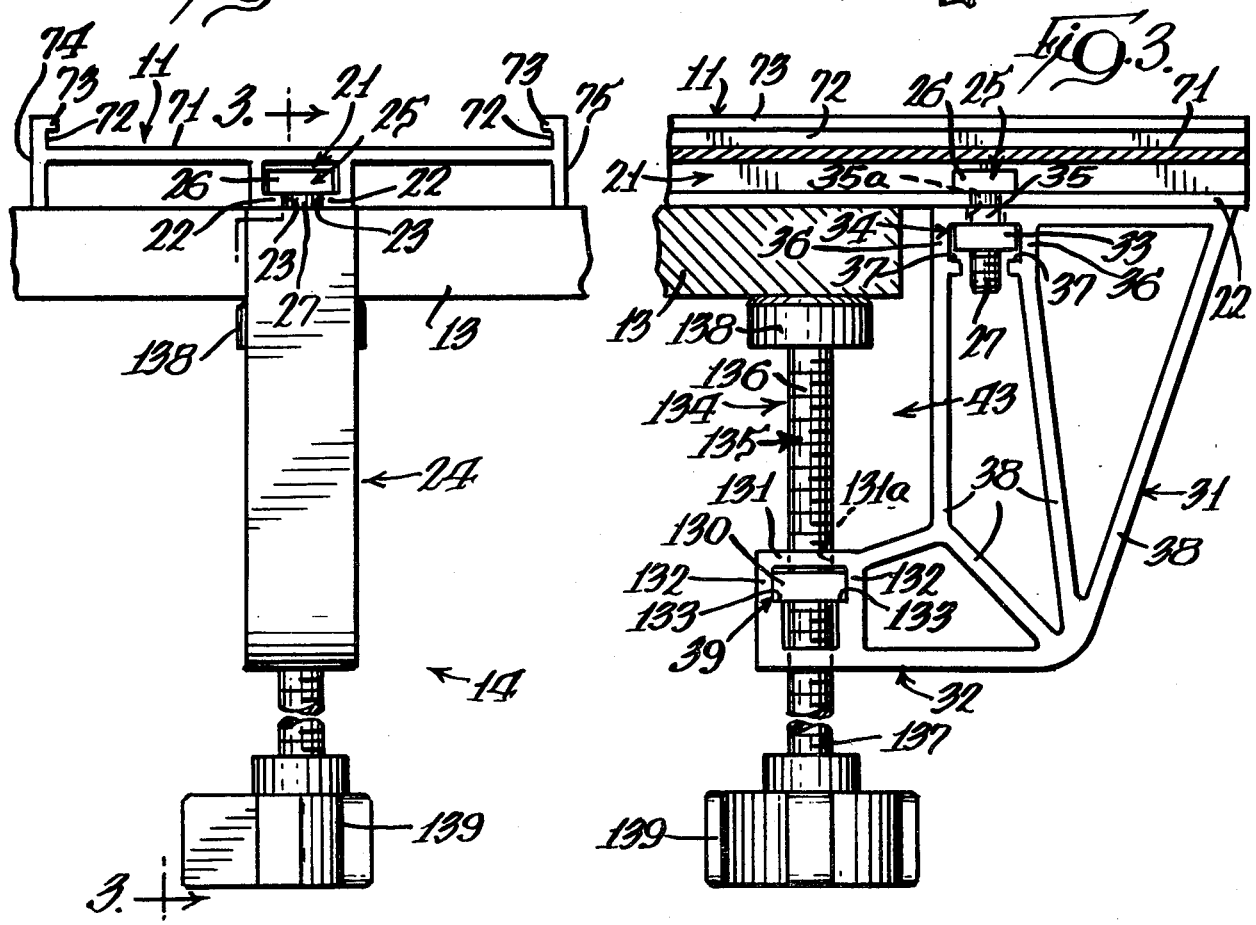

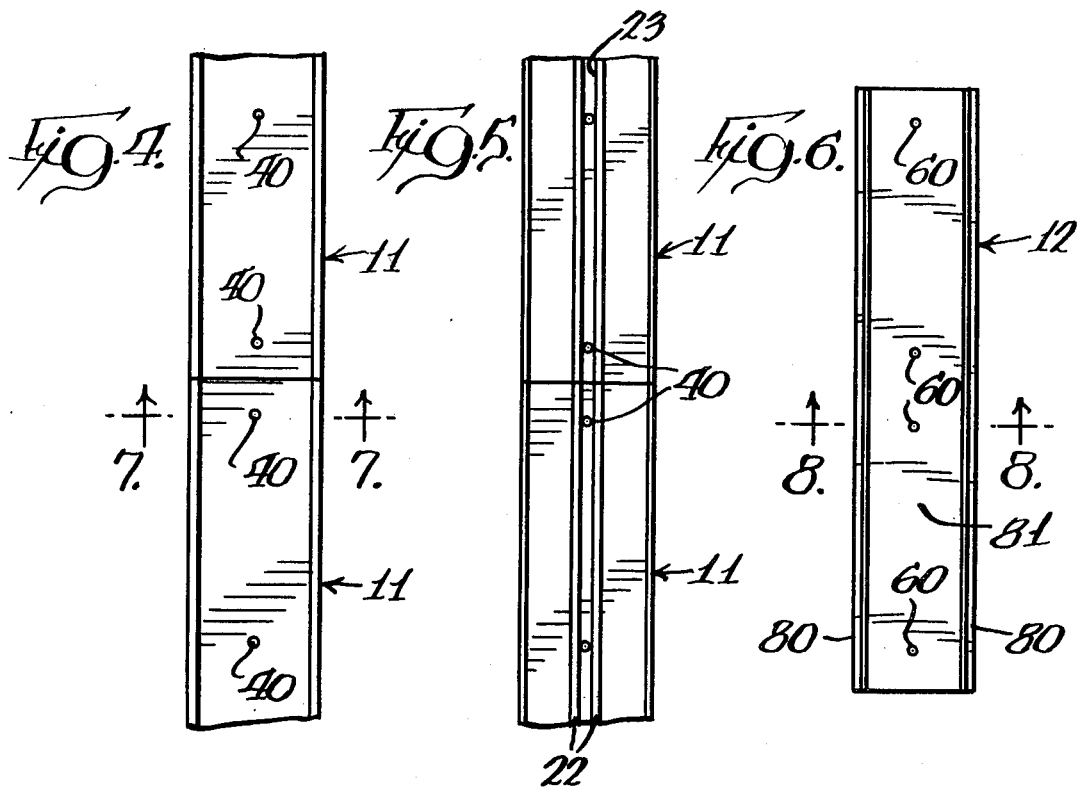

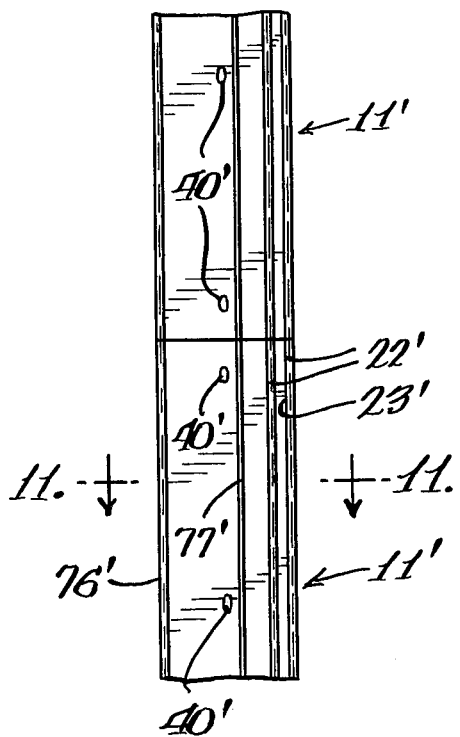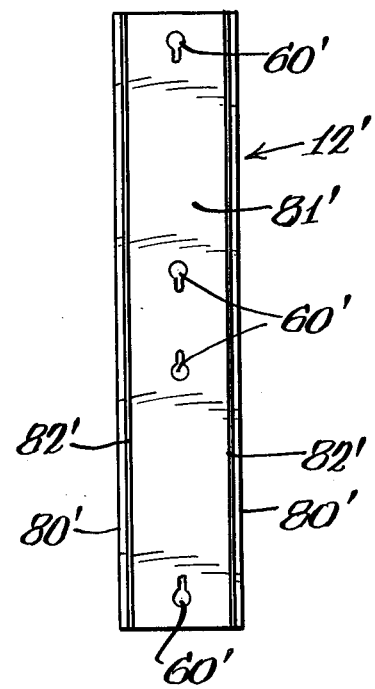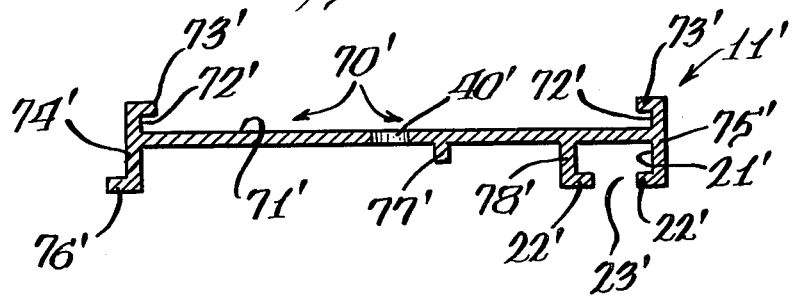

STRAIGHT EDGE GUIDE

DESCRIPTION

Cross-Reference To Related Applications

This application is a continuation-in-part of the U.S. patent application Ser. No. 402,957 filed on July 29, 1982 and entitled "Straight Edge Guide," now abandoned, which in turn is a division of U.S. patent application Ser. No. 235,981 of the same title which was filed on Feb. 19, 1981 and which issued as U.S. Pat. No. 4,381,103.

TECHNICAL FIELD

This invention relates to cutting guides and straight edges designed to provide an edge or guide surface along which a tool may be moved when being operated on a workpiece.

BACKGROUND OF INVENTION

Various designs for cutting guides and straight edges have been proposed in the past. Many cutting guide or straight edge devices have a single "one-piece" guide member designed to be secured to a workpiece, usually by means of a suitable clamp or clamps. Such one-piece devices are not readily adaptable for use with workpieces having dimensions greater than the length of the device and are awkward to use with workpieces that are substantially shorter than the devices.

Such devices have a further disadvantage. If the device is long enough to be used with large workpieces, the device is likely to be too long or bulky for convenient storage. It would be desirable to provide an expandable straight edge which could be easily disassembled into smaller components for use with smaller workpieces and easy storage.

Disclosures have been made of straight edge devices which are adapted to be extended to form a longer straight edge. Examples of such devices are described in the U.S. Pat. Nos. 2,677,399 and 3,915,045. These devices have relatively complex cross-sectional shapes and are not adapted to be clamped to the workpiece with a clamping mechanism mounted to the bottom of the device.

It would be desirable to provide components that include two or more straight edge guide members that could be quickly, easily and tightly secured together to form a longer straight edge. It would also be desirble to provide a connecting means for tightly securing the two guide members together in a manner that would not require the guide members to have complex shapes and configurations. Preferbly, the guide members would be fabricated with a minimum of grooves and ribs that undesirably provide traps for sawdust and the like.

Further, it would be beneficial if the connecting means associated with the guide members would not extend beyond the exterior sides of the guide members. Such a connecting means would not interfere with the use of either exterior side of the guide members as a straight edge or tool guide.

It would also be desirable to provide a channel along the bottom of the guide members for slidably receiving a clamp assembly by which the guide members may be secured to the workpiece.

SUMMARY OF THE INVENTION

The assembly of the present invention is designed to provide an expandable cutting guide and straight edge which can be readily disassembled to provide for its easy storage. Unlike some of the prior cutting guide designs, the present invention is of simple and relatively inexpensive construction, thus providing an expandable straight edge for use by the home hobbyist.

The straight edge assembly comprises two guide members or rails fastened together by a joiner plate fitting within a channel in each of the rails. The joiner plate has an arcuate cross section and lateral margins along its length. One or more fasteners are placed through apertures in the joiner plate and engaged with the rails. When the fastners are tightened, the joiner plate lateral margins are urged outwardly into firm contact with the rails so as to align and secure the rails together to form a continuous straight edge.

In a preferred embodiment, a clamping channel is provided on the bottom of the rails. The clamping channel slidably receives a clamp which can be positioned at any point along the rails to properly hold the workpiece. The body of the clamp may be constructed with an open frame and a retaining cage to hold a nut. The nut is threadingly engaged with a clamp adjustor which can be rotated to engage the workpiece in the clamp.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification and in which like numerals are employed to designate like parts throughout the same;

FIG. 1 is a perspective, fragmentary view showing the straight edge assembly of the present invention being used as a guide for a circular saw cutting a workpiece;

FIG. 2 is an enlarged, fragmentary end view of the straight edge assembly of FIG. 1 showing the clamp holding the workpiece;

FIG. 3 is a fragmentary, cross-sectional view of the straight edge assembly taken along the plane 3—3 in FIG. 2;

FIG. 4 is a fragmentary, top plan view of the straight edge assembly with the joiner plate removed to better illustrate the ends of the two guide rails butting against each other;

FIG. 5 is a fragmentary, bottom view of the assembly of FIG. 4 showing the ends of the two guide rails butting against each other;

FIG. 6 is a plan view of the joiner plate of the straight edge assembly;

FIG. 7 is a greatly enlarged cross-sectional view taken generally along the plane 7—7 of FIG. 4;

FIG. 8 is a greatly enlarged cross-sectional view of the joiner plate taken generally along the plane 8—8 of FIG. 6;

FIG. 9 is a view similar to FIG. 7 but showing the joiner plate of FIG. 8 fastened in place in the rails with a screw and nut;

FIG. 10 is a bottom view similar to FIG. 5 but showing two guide rails of a preferred alternate embodiment;

FIG. 11 is a view taken along the plane 11—11 in FIG. 10 but showing an enlarged cross-section of one of the guide rails of the preferred alternate embodiment; and FIG. 12 is a view similar to FIG. 6 but showing a top plan view of the joiner plate of the preferred alternate embodiment.

DESCRIPTION OF THE PREFERRED EMBODIMENTS

This invention may be used in many different forms and the accompanying drawings disclose only some specific forms as examples of the invention. The invention is not intended to be limited to the embodiments illustrated and the scope of the invention will be pointed out in the appended claims.

The precise shapes and sizes of the components herein described are not essential to the invention unless otherwise indicated. For ease of description, the apparatus of this invention will be described in its normal operating position and such terms as top, bottom, outside edge, etc., will be used with reference to its normal operating position. It will be understood, however, that the apparatus of this invention may be manufactured, stored, transported and sold in an orientation other than the normal operating position described.

Referring now to the drawings, FIG. 1 shows a first embodiment of the straight edge assembly 10 comprising two guide rails 11 held in an end-to-end alignment by a joiner plate 12 to provide a long straight edge for guiding a tool or other implement on a workpiece 13.

The straight edge assembly 10 is held in place on the workpiece 13 by means of a clamp 14 which is slidably attached to the bottom of the rail 11. This provides a fixed stationary straight edge along with a tool, such as a portable circular power saw 100, can be moved to make a straight cut 102 in the workpiece 13. The structure of each rail 11, joiner plate 12, and clamp 14 is described in more detail below.

The clamp structure and method of attaching the clamp 14 to one of the rails 11 is shown in FIGS. 2 and 3. The bottom of each rail 11 has a clamping channel 21 comprising two inwardly extending lips 22 which define a slot 23 therebetween. The clamp 14 is received in the channel 21 as described in detail below.

The clamp 14 has a clamp body 24 comprising a main body portion 31 and a cantilevered body portion 32. The clamp body 24 may be constructed with a open frame comprising a plurality of interconnected frame members 38. The clamp main body portion 31 and the cantilevered body portion 32 together define an adjacent region or throat 37 of the clamp 14 for receiving an end portion of the workpiece. The clamp 14 is slidably attached to the rail 11 in channel 21 at the end of the workpiece by use of a connecting means 25.

The connecting means 25 comprise a cross member 26 and a stem 27 and may be a conventional hex head bolt. The cross member 26 fits into the clamping channel 21 and is engaged by the lips 22 to retain the cross member 26 within the clamping channel 21. The stem 27 extends through the slot 23 (more clearly seen in FIG. 7) and is attached to the main body portion 31 of the clamp 14.

In the first embodiment, the stem 27 is threaded and engaged with the clamp body 24 by a nut 33 held against rotation in a retaining cage 34 of the clamp body 24. The cage 34 comprises a top frame member 35 with an aperture 35a and two opposed side members 36 having seating shoulders 43 on which the nut 33 is supported. The stem 23 passes through the aperture 35a and is threadingly engaged with nut 33. Though not illustrated, it is also possible for the aperture 35a to be threaded and for the connector means to be threadingly engaged therein without the use of a nut.

The cantilevered body portion 32 is provided with a retaining cage 39 in which a nut 130 is retained against rotation. The cage 39 comprises a top frame member 131 with an aperture 131a and two opposed side members 132 having seating shoulders 133 on which the nut 130 is supported.

A clamp adjuster 134 is threadingly engaged with the nut 130 to hold the workpiece 13. The clamp adjuster 134 includes a threaded rod 135 having a first end 136 and a second end 137. Rotation of the rod 135 in one direction or the other will move the first end 136 toward or away from the workpiece 13 to clamp or unclamp the workpiece 13.

Preferably, the clamp adjuster 134 is provided with a clamp pressure pad 138 on the threaded rod first end 136 to aid in clamping and to prevent marring of the workpiece 13. A clamp knob 139 is preferably disposed on the second end 137 of rod 135 to facilitate turning the clamp adjuster 134 by hand.

In use, the workpiece 13 is positioned in the throat 37 of the clamp 14 to allow the clamp adjuster pressure pad 138 to contact the workpiece 13 inwardly of the workpiece edge. This allows a more secure clamping arrangement since the pressure pad 138 is less likely to slip off the edge of the workpiece.

By constructing the clamp 14 with a retaining cage and nut, the clamp can be manufactured less expensively from such materials as extruded aluminum and thermoplastic resins. It is unnecessary to manufacture the clamp body 24 of the present assembly out of solid metal, as is common. The relatively inexpensively fabricated open-framed clamp 14 is easily used by the home hobbyist.

The clamp 14 of the present invention, being slidably received in the bottom of the straight edge assembly 10, does not interfere with any cutting or similar operation taking place on the workpiece or above the rail. For example, consider the use of the straight edge assembly 10 as illustrated in FIG. 1. The circular saw 100 typically has a motor case 101 projecting over the straight edge assembly 10. Thus, to avoid interference with the saw 100, it is desirable that no part of the clamp extend above the straight edge assembly or on either side of the assembly.

The ends of the rails 11 are designed to allow two or more such rails to be placed in an end-to-end butting relationship to provide a continuous straight edge as shown at 41 in FIGS. 4 and 5. In the first embodiment, both ends are designed to accomodate a butting relationship, thus allowing a plurality of rails to be connected providing an even longer straight edge. Each rail is also preferably provided with at least one threaded aperture 40 near each end of the rail to accomodate the attachment of the joiner plate 12 in a matter to be described in more detail hereinafter.

The cross section of each rail 11 is most clearly shown in FIG. 7. Each rail 11 has a channel 70 into which the joiner plate 12 is received while it holds two rails in an end-to-end butting relationship. The rail channel 70 has a bottom surface 71 and two inwardly facing planar side surfaces 72 that are substantially perpendicular to the bottom surface 71.

In the illustrated first embodiment, each rail 11 is provided with flanges 73 extending inwardly from the side surfaces 72 which prevent the joiner plate from being removed vertically from the rails. The exterior portion of each rail 11 has at least one outwardly facing surface 74 which presents a straight surface or edge for guiding a tool or other implement. In that preferred embodiment, the other outwardly facing surface 75 can also serve as a straight edge.

The structure of the joiner plate 12 is shown in FIGS. 6 and 8. FIG. 6 shows the joiner plate 12 with apertures 60 which are located to be aligned with the apertures 40 of the rails 11 when the joiner plate 12 is placed over the butting ends of the rails.

The cross section of the joiner plate 12 is best shown in FIG. 8. The joiner plate 12 has a generally arcuate cross section, two lateral margins 80 and a central region 81 designed to be spaced upwardly from the rail bottom surface 71 when in use. In the preferred embodiment, the joiner plate 12 also has a pair of upper rigidifying ribs 82 and a pair of lower rigidifying ribs 83 which add strength to the joiner plate. The joiner plate 12 is of sufficient width to permit the plate to be received in the channels 70 of the two butting rails with the plate lateral margins 80 engaging each rail within the channels.

To assemble the two rails 11 into one long straight edge assembly, the rails are aligned and butted together end-to-end with the joiner plate 12 engaging the two rails. The central region 81 of the joiner plate 12 is then forced downwardly (by means explained in detail hereinafter) toward the bottom surface 71 of the rail channel 70. This causes the joiner plate 12 to become less arcuate, thus increasing the projected width of the joiner plate. As a result, the lateral margins 80 are urged outwardly into contact with the inwardly facing planar side surfaces 72 of the channel thereby holding and aligning the two rails as an assembly defining one continuous straight edge.

In the first embodiment, the downward application of force on the joiner plate is effected by the use of a screw 90. The screw 90 passes through the aperture 60 of the joiner plate 12 and threadingly engages the rail 11 in the threaded aperture 40.

If desired, a nut 91 may be threaded on screw 90 beneath the joiner plate 12 so that the screw 90 remains connected to the joiner plate 12 when the straight edge rail assembly is taken apart. The nut 91 is illustrated as a Tinnerman nut which is mounted "backwards" on the screw 90 beneath the plate 12 to permit the screw 90 to still be threadingly adjusted in either direction of rotation as necessary when connecting or disconnecting the rails.

The novel rail connection design described above, wherein the joiner plate 12 is disposed within the rails 11, provides an additional advantage. Since the joiner plate 12 does not extend beyond the exterior sides of the guide rails, it does not interfere with the operation of tools, such as the circular power saw 100 and its overhanging motor 101. The novel joiner plate 12 allows both outside edges to be used as straight edges.

FIGS. 10-12 illustrate a preferred alternate embodiment of the invention. As best illustrated in FIGS. 10 and 11, two rails 11' are provided for being placed in an end-to-end butting relationship to provide one or more continuous straight edges.

Each rail 11' has a channel 70' in which a joiner plate 12' (shown separately in FIG. 12) is received in a manner analagous to the reception of the joiner plate 12 in the first embodiment of the invention described above with reference to FIGS. 1-9. The rail channel 70' has a bottom surface 71' and two inwardly facing planar side surfaces 72'. Each rail 11' is also provided with flanges 73' extending inwardly from the side surfaces 72' so as to prevent the joiner plate 12' from being removed vertically from the rails 11'.

Each rail 11' is also provided with two side legs, leg 74' on one side and leg 75' on the other side. The outer surface of the leg 75' is intended to serve as a flat straight edge for use with power tools. The other leg 74' has an outwardly directed bottom flange 76' which is intended for use as a straight edge in making knife cuts or pencil markings.

Preferably, each rail 11' defines two spaced-apart, oval, unthreaded apertures 40' adjacent each end. The apertures 40' are generally centrally located along the longitudinal axis of each rail 11' and accommodate the attachment of the joiner plate 12' in a manner described in more detail hereinafter.

The underside of each rail 11' is provided with a channel structure for accommodating securement of each rail 11' to a workpiece by means of a suitable clamp, such as the type of clamp 14 described above with reference to FIGS. 2 and 3. To this end, a clamping channel 21' is defined between the leg 75' and another downwardly depending leg 78'. The legs 75' and 78' are provided with inwardly directed lips or flanges 22' which define between them a slot 23'. As in the first rail embodiment illustrated in FIGS. 2 and 3, the channel 21' in the second embodiment of FIG. 11 is intended to receive the head of a bolt while the slot 23' is intended to receive the stem (e.g., stem 27 in FIG. 3) of the bolt supporting the clamp 14 in the rail.

The joiner plate 12' is generally similar to the joiner plate 12 of the first embodiment illustrated in FIGS. 1-9 and described above. The plate 12' has a generally arcuate cross-section with two lateral margins 80', a central region 81' and ribs 82'. However, unlike the first embodiment joiner plate 12, the alternate embodiment joiner plate 12' has keyhole-shaped apertures 60' rather than circular apertures. The enlarged portion of each keyhole-shaped aperture 60' is intended to be initially aligned with a corresponding oval aperture 40' of a rail 11' when the joiner plate 12' is mounted in the rail channel 70' to secure the two rails 11' together.

A conventional nut with a screw or bolt (not illustrated) can be used to effect a secure joint between the members. The bolt or screw functions as a retaining means for engaging the plate's central region 81' with the head of the screw or bolt bearing against the central region 81'.

Typically, a slotted-head screw or bolt (not illustrated) would be positioned through each rail aperture 40' with the head of the screw or bolt located in the channel 70'. Then, a nut would be threaded part way on each screw or bolt from beneath the rail. After each of the nut and bolt pairs is loosely assembled in the rails 11', the joiner plate 12' can be slid halfway onto one of the rails and aligned with two bolt heads on that first rail so that the large portions of the keyhole-shaped apertures 60' will fit over the bolt heads.

The assembler next pushes the bolts up from below so the bolt heads extend through the large portions of the apertures 60'. Then the assembler slides the joiner plate 12' slightly inwardly along the first rail 11' to trap the raised bolts in the narrow portions of the keyhole-shaped apertures 60'.

Next, the second rail 11' is slid onto the other end of the joiner plate 12' and positioned near the end of the first rail 11' so that the two remaining bolts can be pushed up into the large portions of the keyhole-shaped apertures 60' of the overlying portion of the joiner plate 12'. Then the rails are brought into end-to-end abutment to trap the two remaining bolts in the narrow portions of the keyhole-shaped apertures 60' of the second rail 11'. Finally, all of the bolts can be tightened to effect a secure assembly.

As the screws or bolts are tightened, the screws or bolts threadingly engage the rails 11' via the nuts which became snugged up against the bottoms of the rails. This causes the central region 81' of the joiner plate 12' to be forced downwardly toward the bottom surface 71' of each rail channel 70' As a result, the joiner plate lateral margins 80' are forced outwardly into contact with the inner side surfaces 72' of the channel 70' thereby holding and aligning the two rails 11' as an assembly defining at least one continuous straight edge.

A rigidifying rib 77' may be provided between the two legs 74' and 75' of each rail 11' to one side of the apertures 40'. The rib 77' can also function as an abutment to prevent the rotation of nuts that may be used to secure the joiner plate 12' and the two rails 11' together as described above.

When the components are disassembled, the joiner plate 12' may be left attached to one rail 11'. This enables the rails 11' to be quickly and easily joined.

The foregoing specification is intended as illustrative and is not to be taken as limiting. Still other variations within the spirit and scope of this invention are possible and will readily present themselves to those skilled in the art.

What is claimed is:

1. Components for forming a straight edge, the components comprising:
    (a) two rails, each rail having a straight edge, two ends, and a cross section defining a channel, each rail being adapted to be placed in an end-to-end butting relationship with the other rail to form a continuous straight edge;
    (b) a joiner plate having a arcuate cross section and a pair of lateral margins along its length, the plate being of sufficient width to permit the plate to be received in the channels of each of the two butting rails with the plate lateral margins engaging each rail within the channels and with a central region of the plate between the lateral margins being spaced upwardly from the bottom of each channel; and
    (c) retaining means for engaging the plate central region under the application of force to deflect the plate central region downwardly and thereby urging the plate lateral margins outwardly against the rails so the rails are securely held together to form a rigid straight edge.

2. The components of claim 1 wherein the retaining means comprises at least one screw adapted to be threadingly engaged for axial movement relative to at least one of the rails with the screw head bearing against the central region of the joiner plate.

3. The components of claim 2 wherein said one rail has a threaded aperture threadingly engaged with the screw.

4. The components of claim 1 wherein the channel in each rail is defined by a bottom surface and two opposed, inwardly facing, planar side surfaces, the inwardly facing side surfaces being substantially perpendicular to the channel bottom surface and wherein the rail has at least one outwardly facing planar surface substantially parallel to the inwardly facing side surfaces for presenting a straight surface and edge.

5. The components of claim 1 wherein each rail is made of extruded aluminum.

6. The components of claim 1 wherein the joiner plate is made of extruded aluminum.

7. The components of claim 1 wherein each rail has a flange on each side of the channel projecting into the channel and extending generally parallel to the bottom of the channel.

8. The components of claim 1 wherein each rail also includes a clamping channel with a pair of opposed inwardly extending lips defining there between a slot for receiving a clamp that can be slidably positioned in the clamping channel.

9. Components for forming a straight edge, the components comprising:
    (a) two rails, each rail having two ends with a threaded aperture near each end and a generally C-shaped cross section defining a joiner plate receiving channel, the channel of each rail having a bottom surface and two opposed, inwardly facing planar side surfaces, the inwardly facing side surfaces being substantially perpendicular to the bottom surface, each rail also having at least one outwardly facing planar surface substantially parallel to the inwardly facing side surfaces for presenting a straight surface and edge, each rail being adapted to be placed in an end-to-end butting relationship with the other rail to form a continuous straight edge;
    (b) a joiner plate having a arcuate cross section and a pair of lateral margins along its length, the plate also having at least one rigidifying rib within a central region of the plate between the margins, the plate also defining at least two spaced apart apertures in the central region, the plate being of sufficient width to permit the plate to be received in the channels of the two butting rails with the plate lateral margins engaging each rail within the channels, with the central region being spaced upwardly from the bottom of each rail channel, and with each plate aperture aligned with a rail aperture; and
    (c) a screw adapted to be disposed within each pair of aligned apertures in the plate and one of the rails with the screw head engaging the plate central region and with the screw threadingly engaged with the rail whereby tightening the screw deflects the plate central region downwardly thereby urging the plate lateral margins outwardly against the rails so that the rails are securely held together to form a rigid straight edge.

* * * * *